United States Patent [19]
Arbesman

[11] Patent Number: 6,122,951
[45] Date of Patent: Sep. 26, 2000

[54] METHOD OF MANUFACTURING A DISC BRAKE PLATE WITH AN EDGE HOLE

[76] Inventor: Ray Arbesman, 42 Burton Rd., Toronto, Ontario, Canada, M5P 1V2

[21] Appl. No.: 09/090,783

[22] Filed: Jun. 4, 1998

[30] Foreign Application Priority Data

Nov. 12, 1997 [CA] Canada ..................................... 2220796

[51] Int. Cl.⁷ ....................................................... B21K 1/74
[52] U.S. Cl. ............................................ 72/377; 72/379.2
[58] Field of Search .............................. 72/325, 372, 373, 72/377, 379.2

[56] References Cited

U.S. PATENT DOCUMENTS

| | | | |
|---|---|---|---|
| 2,358,304 | 9/1944 | Cogsdill | ..................................... 72/372 |
| 4,569,424 | 2/1986 | Taylor, Jr. . | |
| 5,141,083 | 8/1992 | Burgoon . | |
| 5,358,086 | 10/1994 | Muller . | |
| 5,388,675 | 2/1995 | Kahr . | |
| 5,427,213 | 6/1995 | Weiler . | |

FOREIGN PATENT DOCUMENTS

| | | |
|---|---|---|
| 618550 | 4/1961 | Canada . |
| 349497 | 1/1990 | European Pat. Off. . |
| 24 27 694 | 12/1975 | Germany . |
| 56-31535 | 3/1981 | Japan . |

Primary Examiner—Lowell A. Larson
Attorney, Agent, or Firm—Oldham & Oldham Co., L.P.A.

[57] ABSTRACT

A method of manufacturing a disc brake backing plate with an edge hole which comprises the steps of first forming two substantially parallel grooves on the outer surface of the backing plate to define a raised section between the grooves. A channel is then formed within the raised section to define two ridges bounding the channel. Finally, the ridges are bent toward each other to define the hole.

7 Claims, 3 Drawing Sheets

METHOD OF MANUFACTURING A DISC BRAKE PLATE WITH AN EDGE HOLE

BACKGROUND OF THE INVENTION

1. Field of the Invention

The present invention relates to disc brakes for automobiles, and in particular, to a method of manufacturing a disc brake backing plate with a hole located within an edge of the backing plate.

In manufacturing a backing plate, it is customary to place a backing plate pre-form on an assembly line where tools with different punching and stamping surfaces will shape its contact surface to produce features such as holes or knobs to assist in attaching and retaining a friction pad. However, an additional hole within the edge of the backing plate parallel to the surface may be required, for example, to retain a conventional anti-rattle spring.

2. Description of the Prior Art

Prior art methods for manufacturing a backing plate with an edge hole have required the backing plate to be removed from the assembly line and for the hole to be drilled by hand, requiring additional labor, creating delays and adding costs. In addition, drilling a hole within the edge may introduce structural weaknesses into the backing plate leading to cracking and other modes of structural failure.

SUMMARY OF THE INVENTION

The present invention overcomes these deficiencies of the prior art by providing a method for manufacturing a disc brake backing plate with an edge hole by preferably punching the hole into the backing plate as it moves along an assembly line, without requiring manual labor to remove the backing plate and drill the hole. The improved method provides significant cost savings by eliminating the manual labor required to drill the hole and reducing the time for manufacturing the backing plate.

The present invention comprises a method whereby two preferably parallel grooves are formed within the outer surface of the backing plate to define a rounded raised section running between the grooves. Preferably, a generally semi-circular channel is then formed in the raised section to define two generally parallel ridges bounding the channel. Finally, the ridges are bent toward each other to define a preferably generally circular edge hole.

With the above and other objects in view, more information and a better understanding of the invention will be achieved by referring to the following description.

BRIEF DESCRIPTION OF THE DRAWINGS

The present invention, as exemplified by a preferred embodiment, is described with reference to the drawings in which.

DETAILED DESCRIPTION OF THE PREFERRED EMBODIMENT

Figure 1:
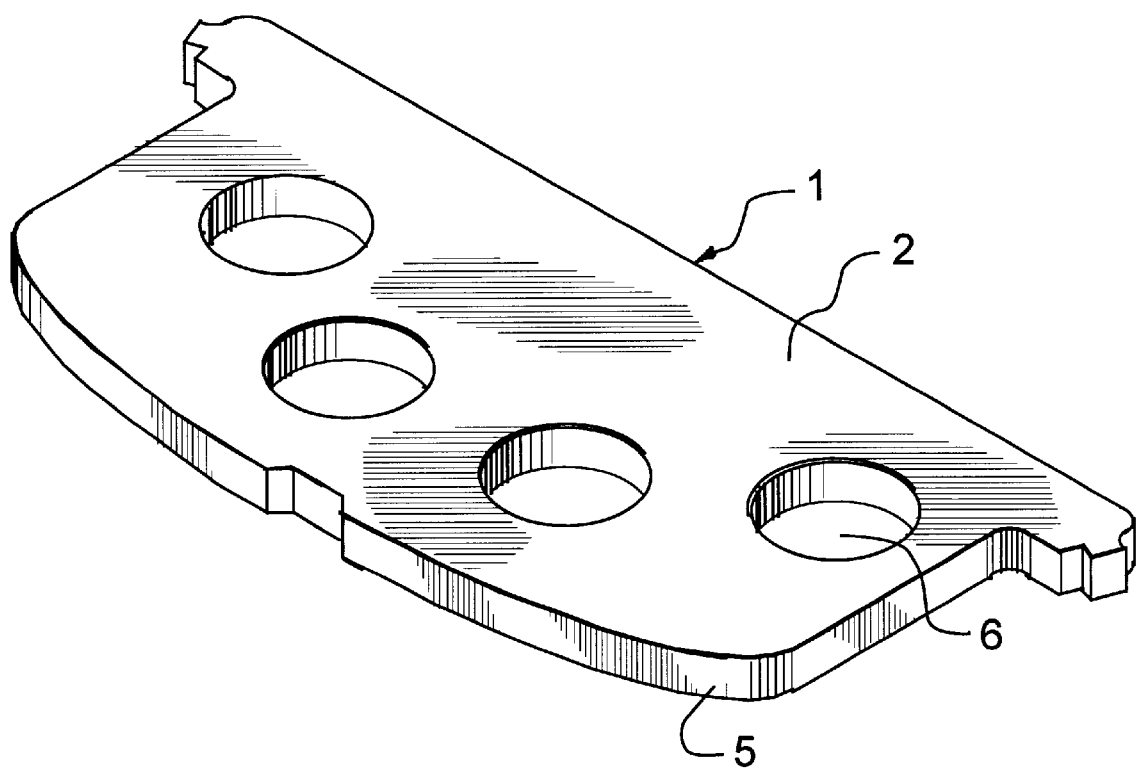
FIG. 1 is a perspective view of the disc brake backing plate before application of the method.

FIG. 1 shows a generally flat backing plate 1, preferably stamped from a single piece of steel, having a contact surface 2 to which a friction pad (not shown) is attached, a parallel outer surface 4, and an edge 5. A plurality of holes 6 penetrate the backing plate configured to retain the friction pad.

Figure 2:
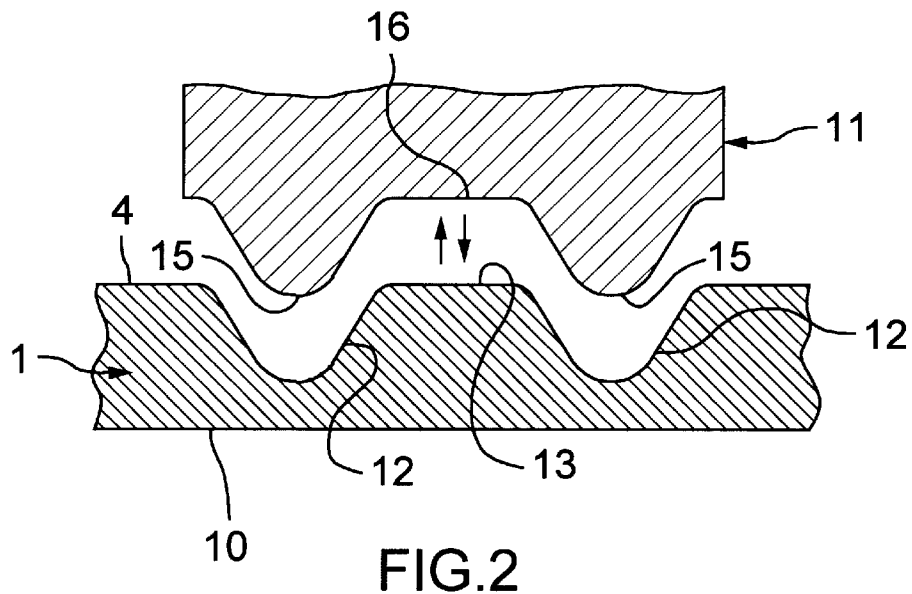
FIG. 2 is a cross-sectional view showing the first step in the method of manufacturing the backing plate with the edge hole.

As shown in FIG. 2, the backing plate 1 is positioned on a rigid platform 10, which forms part of an assembly line. FIG. 2 also shows the first step of the process, where, preferably, a first punching tool 11 punches the outer surface 4 of the backing plate to form two generally parallel grooves 12. The material between the grooves is displaced by the impact to form a rounded raised section 13 between the grooves. The impact surface of the first punching tool preferably comprises two rounded vertical projections 15 extending downwardly on either side of a depression 16.

Figure 3:
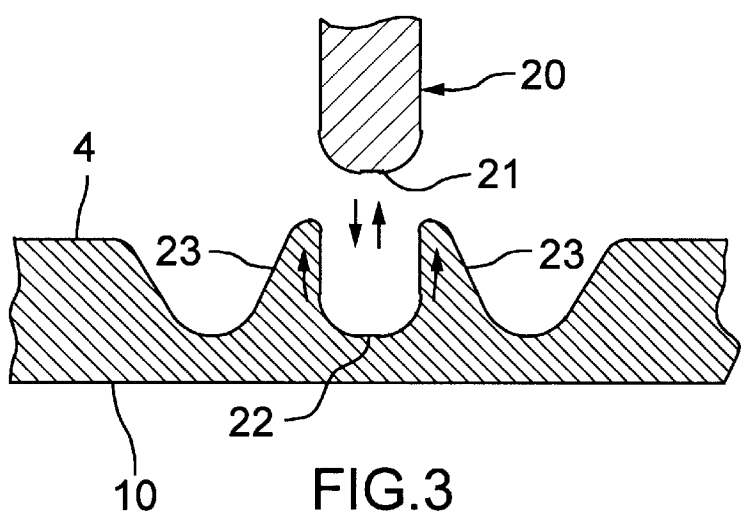
FIG. 3 is a cross-sectional view showing the second step in the method of manufacturing the backing plate with the edge hole.

The backing plate 1 then moves along the assembly line to the second step in the process, as shown in FIG. 3. A second punching tool 20 having a convex surface at its distal end 21 punches the raised section 13 of the backing plate to form a preferably semi-circular channel 22 and two upwardly extending ridges 23 bounding the channel.

Figure 4:
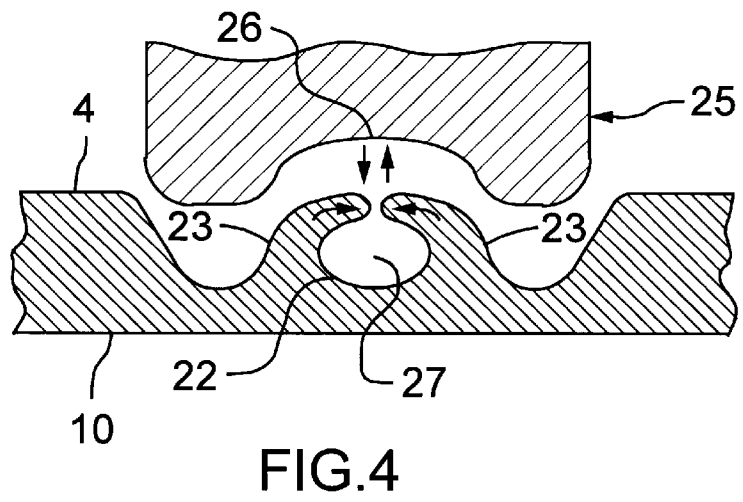
FIG. 4 is a cross-sectional view showing the third step in the method of manufacturing the backing plate with the edge hole.

FIG. 4 shows the final step in the process, where a third punching tool 25 having a concave surface at its distal end 26 impacts downwardly on the two ridges with sufficient force to cause them to bend toward each other, and, together with the semicircular channel, to form a preferably circular edge hole 27.

Figure 5:
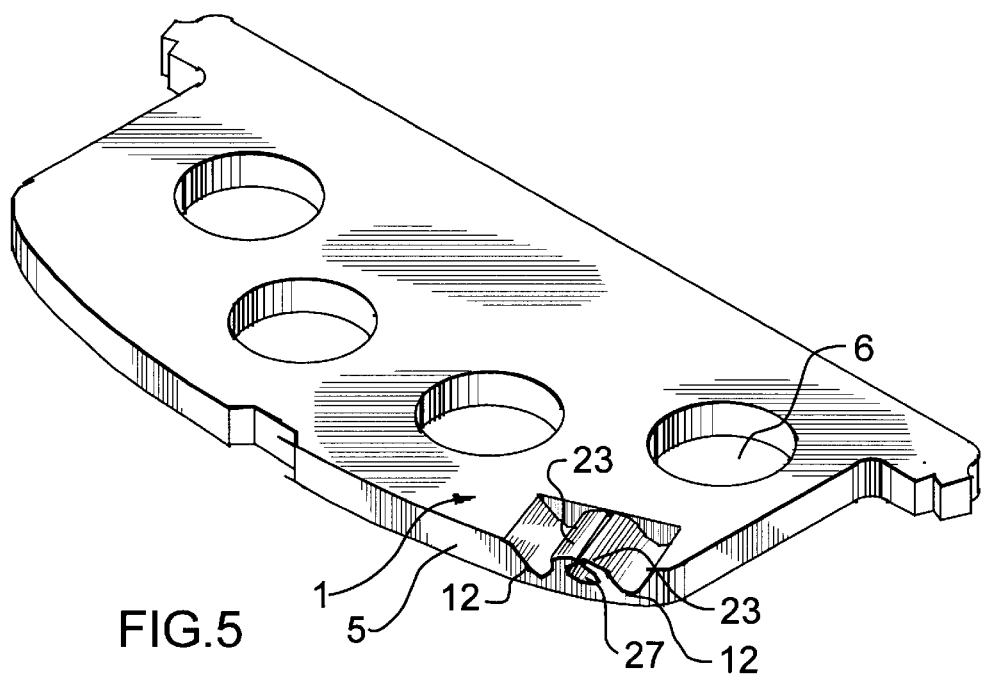
FIG. 5 is a perspective view showing the backing plate with the edge hole manufactured by the method.
Figure 6:
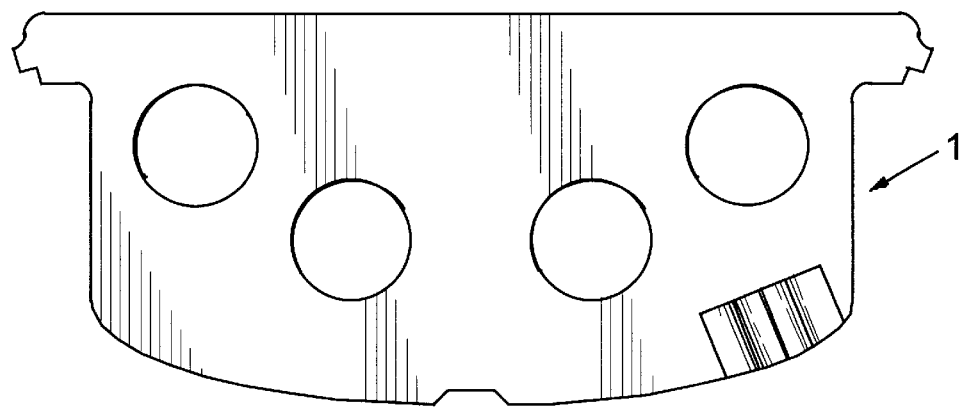
FIG. 6 is a top view of the backing plate with the edge hole manufactured by the method.
Figure 7:
FIG. 7 is an elevation view of the backing plate with edge hole manufactured by the method.

The edge hole produced according to the method of the present invention, as best seen in FIGS. 5–7, can be used in a number of ways in a disc brake assembly, such as, for example, to retain a conventional anti-rattle spring (not shown).

The present invention has been described in detail and with particular reference to the preferred embodiments; however, it will be understood that modifications to the present invention could be made by one skilled in the art without departing or deviating from the spirit or scope of the invention herein described.

What is claimed as the invention is:

1. A method of manufacturing a metallic disc brake backing plate with an edge hole comprising the steps of:
    a) forming two substantially parallel grooves on a surface of said backing plate by displacing metal therein to define a raised section running between said grooves;
    b) forming a channel within said raised section by further displacing metal to define two substantially parallel ridges bounding said channel; and
    c) bending said ridges toward each other to define the edge hole.

2. A method of manufacturing a disc brake backing plate as defined in claim 1, wherein said grooves and said raised section are cold-formed by punching said backing plate with a first punching tool.

3. A method of manufacturing a disc brake backing plate as defined in claim 2, wherein the distal end of said first punching tool comprises a rounded depression bounded by two substantially parallel projections to form said grooves and said raised section upon impact with said backing plate.

4. A method of manufacturing a disc brake backing plate as defined in claim 1, wherein said channel and said ridges are cold-formed by punching said projection with a second punching tool.

5. A method of manufacturing a disc brake backing plate as defined in claim 4, wherein the distal end of said second punching tool has a convex surface to form said channel and said ridges upon impact with said raised section, said channel having a substantially semi-circular cross-section to correspond with said convex surface of said punching tool.

6. A method of manufacturing a disc brake backing plate as defined in claim 1, wherein said ridges are bent to define said hole by punching said ridges with a third punching tool.

7. A method of manufacturing a disc brake backing plate as defined in claim 6, wherein the distal end of said third punching tool has a concave surface to bend said ridges toward each other upon impact with said ridges to form a substantially circular hole.

* * * * *